June 22, 1948.  E. A. ROTHFUS  2,443,664
SWITCHGEAR
Filed Sept. 29, 1944  5 Sheets-Sheet 1

WITNESSES:

INVENTOR
Elmer A. Rothfus.
BY
ATTORNEY

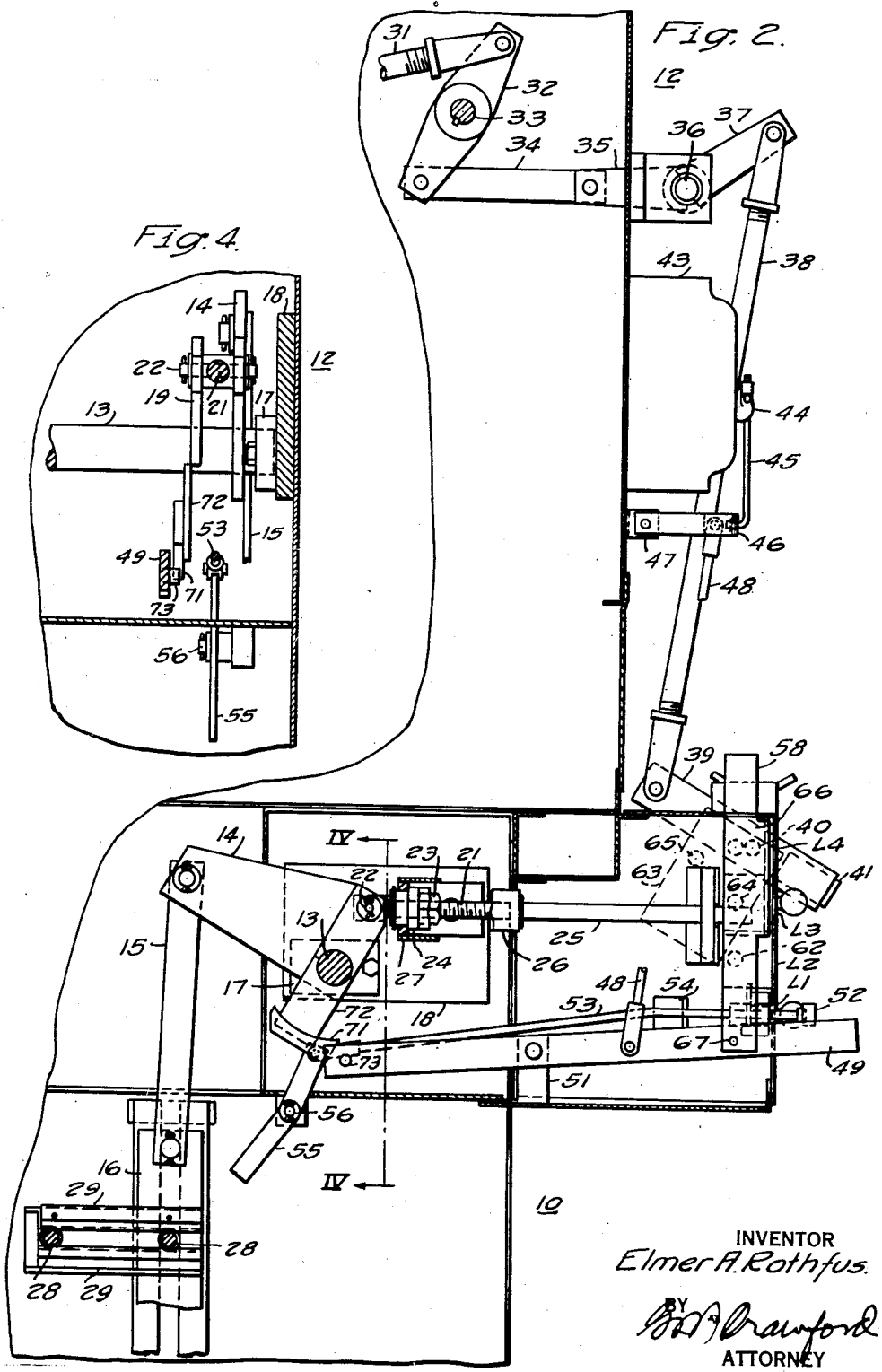

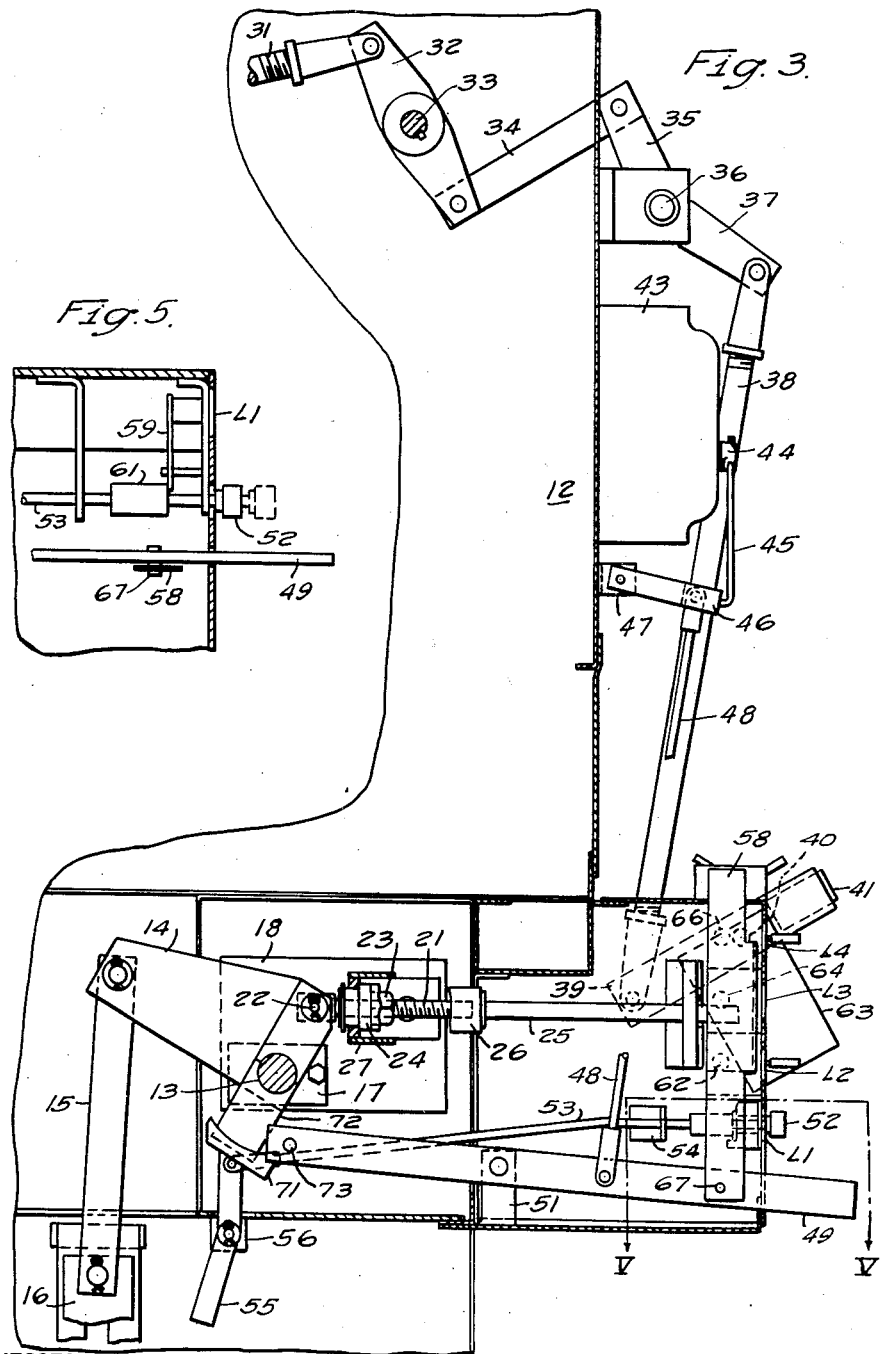

June 22, 1948. E. A. ROTHFUS 2,443,664
SWITCHGEAR
Filed Sept. 29, 1944 5 Sheets-Sheet 4
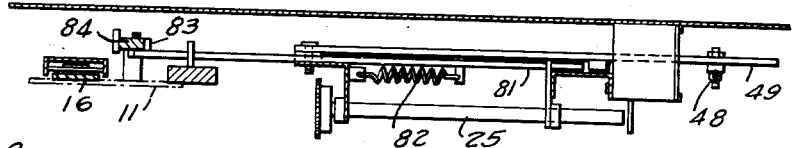
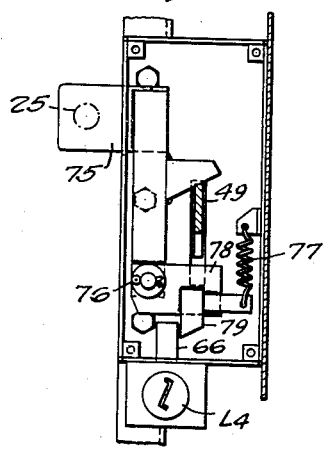
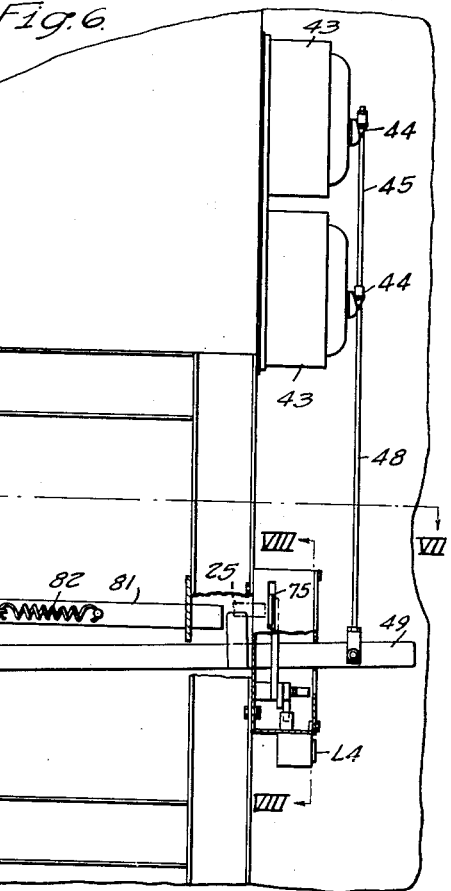
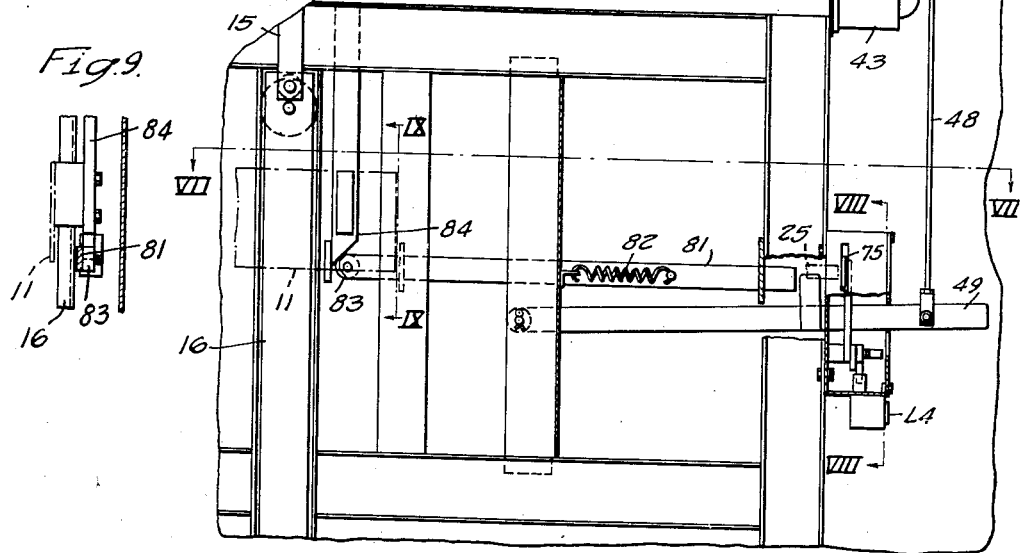
INVENTOR
Elmer A. Rothfus.
ATTORNEY June 22, 1948. E. A. ROTHFUS 2,443,664
SWITCHGEAR
Filed Sept. 29, 1944 5 Sheets-Sheet 5

WITNESSES:

INVENTOR
Elmer A. Rothfus.
BY
Crawford
ATTORNEY

Patented June 22, 1948

2,443,664

UNITED STATES PATENT OFFICE 2,443,664

SWITCHGEAR

Elmer A. Rothfus, Pittsburgh, Pa., assignor to Westinghouse Electric Corporation, East Pittsburgh, Pa., a corporation of Pennsylvania Application September 29, 1944, Serial No. 556,386

8 Claims. (Cl. 175—298)

My invention relates, generally, to switchgear apparatus and, more particularly, to interlocking systems for protecting the circuit breakers and disconnect switches of explosion-proof switchgear.

In the design of explosion-proof metal-clad switchgear of the vertical-lift type it is necessary that all contact members, primary and secondary, be closed and opened under oil or in an explosion-proof chamber. In order to accomplish this result oil-immersed disconnecting switches may be mounted above an oil circuit breaker of the vertical-lift type and the disconnecting switches utilized to disconnect the circuit breaker from the line and from the bus and ground it before lowering it from the operating position. Furthermore, the control power for each unit may be so connected through a secondary explosion-proof breaker that all control power can be shut off before lowering the main breaker.

An object of my invention is to provide for so interlocking the lifting mechanism of the oil circuit breaker with the oil-immersed disconnecting switches and the control-power breaker as to insure that the disconnecting switches and the control-power breaker are open and held in the open position at all times except when the oil circuit breaker is in the operating position.

Another object of my invention is to provide an interlocking system which insures that the disconnecting switches are locked in the grounded position before the operation of lowering the oil circuit breaker can be started.

A more general object of my invention is to provide an interlocking system for switchgear apparatus which shall be simple and efficient in operation and which may be economically manufactured and installed.

Other objects of my invention will be explained fully hereinafter or will be apparent to those skilled in the art.

In accordance with one embodiment of my invention a shutter is normally locked in a position to prevent operation of the lifting mechanism for a vertical lift breaker. The key for unlocking the shutter is normally held in a lock on the disconnecting switch mechanism and can be removed only when the disconnecting switch is locked in the open position. The key which permits the disconnecting switch to be opened is normally held in a lock on the breaker tripping mechanism and can be removed only when the breaker is tripped open and the tripping mechanism locked in the tripped position.

For a fuller understanding of the nature and objects of my invention, reference may be had to the following detailed description, taken in conjunction with the accompanying drawings, in which:

Fig. 2 is a view, partially in side elevation and partially in section, of the structure shown in Fig. 1, the section being taken along the line II—II of Fig. 1;

Fig. 3 is a view, similar to Fig. 2, showing the interlocking mechanism in the open position;

Fig. 4 is an enlarged detailed view taken along the line IV—IV of Fig. 2;

Fig. 5 is an enlarged detailed view taken along the line V—V of Fig. 3;

Fig. 6 is a view, partially in side elevation and partially in section, of a portion of a switchgear structure embodying a modification of my invention;

Fig. 7 is a view, in section, taken along the line VII—VII of Fig. 6;

Fig. 8 is an enlarged detailed view taken along the line VIII—VIII of Fig. 6;

Fig. 9 is a detail view taken along the line IX—IX of Fig. 6;

Figure 1:
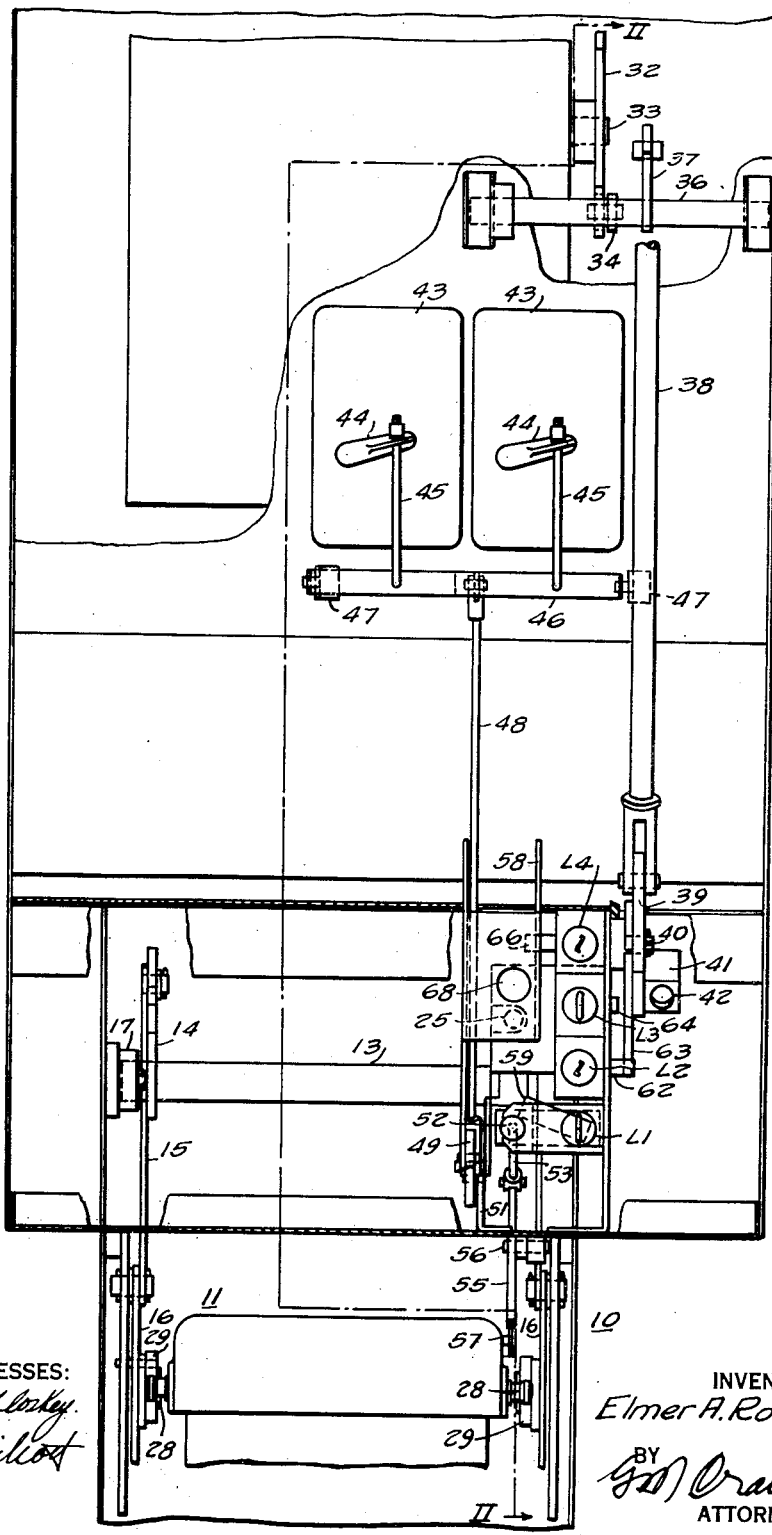
Figure 1 is a view, partially in front elevation and partially in section, of a portion of a switchgear structure embodying my invention.

Referring now to the drawings, and particularly to Figs. 1, 2, 3 and 4, the structure shown therein comprises a sheet metal cell 10 of a type usually provided for housing an oil circuit breaker unit 11. A superstructure 12 is provided at the top of the cell 10 in which power conductors (not shown) and disconnecting switches (not shown) may be disposed for connection to the circuit breaker 11 through primary disconnect contacts (not shown), which may be of the usual type having stationary contact members mounted in the superstructure 12 and movable contact members carried by the circuit breaker 11.

In accordance with the usual practice the breaker unit 11 may be raised vertically in the cell by an elevating device which may be of the type fully described in Patent No. 2,276,653, issued March 17, 1942, to B. I. Hayford and A. L. Fletcher. Briefly, the elevating device comprises a shaft 13 with two crank arms 14 connected by links 15 to elevating members 16, one of which is disposed at each side of the cell 10. The ends of the shaft 13 are rotatably mounted in bearings 17 which are bolted to plates 18 secured to the sides of the superstructure 12.

A short lever 19 and one of the crank arms 14 at one end of the shaft 13 are connected to a screw 21 by means of a pin 22. The screw 21 extends through a nut 23 which is so disposed in a thrust bearing 24 that the shaft 13 is rotated when the nut 23 is turned by a shaft 25 having a socket 26 on one end for engaging the nut 23. The other end of the shaft 25 may be engaged by a suitable wrench under predetermined conditions, as will be more fully explained hereinafter. The thrust bearing 24 is mounted on a member 27 secured to one of the plates 18.

The breaker unit has two lugs or studs 28 on each side which are engaged by the elevating device to raise the breaker to the operating position. The supporting studs 28 enter between two members 29 carried by each one of the elevating members 16 disposed at each side of the breaker. The upper members 29 are hinged at the rear to permit their front end to swing upwardly for clearance when the breaker enters the housing 10.

The disconnecting switches in the superstructure 12 may be actuated by a rod 31, one end of which is connected to one end of a crank arm 32 secured to a shaft 33 rotatably disposed in the superstructure. The other end of the crank arm 32 is connected by a link 34 to a crank arm 35 secured to a shaft 36 rotatably disposed in the structure. The shaft 36 is rotated by a crank arm 37 which is connected by a rod 38 to a lever 39 pivotally mounted on a pin 40 in the superstructure 12. A lug 41 is secured to one side of the lever 39 and is provided with an opening 42 into which a bar or other suitable device may be inserted to operate the disconnecting switches.

As explained hereinbefore, for certain applications it is desirable to provide for removing the control power from all of the control circuits before the circuit breaker is lowered. In the present structure two circuit breakers 43, which may be of an explosion-proof type, are mounted on the outside of the superstructure 12 for controlling the power supply to the control circuits.

Each circuit breaker 43 is provided with an actuating handle 44 mounted on the outside of the circuit breaker housing. The handles 44 are connected by rods 45 to a cross-bar 46 which is pivotally mounted on supporting members 47 secured to the outside of the superstructure 12. The bar 46 is connected by a rod 48 to an interlocking handle 49 which is pivotally mounted on a bracket 51 inside of the superstructure 12. As shown, one end of the handle 49 extends through an opening provided in the wall of the superstructure 12. Thus, when the end of the handle 49 is lowered the breakers 43 are tripped open and held open as long as the handle 49 is in the down position. However, the breakers 43 are not closed when the handle 49 is raised since the rods 45 are slidably disposed in the handles 44.

In accordance with the usual practice, the contact members which are disposed inside of the circuit breaker unit 11 may be tripped to the open position by means of a trip button 52, disposed on one end of a rod 53, which is slidably mounted in a bracket 54. The other end of the rod 53 is connected to a lever 55, which is pivotally mounted on a pin 56 inside of the cell structure 10. As shown in Fig. 1, the lever 55 engages a tripping arm 57 on the circuit breaker unit 11, thereby tripping the operating mechanism for the circuit breaker contact members when the button 52 is pushed inwardly.

In order to insure that the contact members of the circuit breaker are open before the primary disconnect contact members can be engaged or disengaged, and that the disconnecting switches and the control power breakers are open and held in the open position at all times, except when the oil circuit breaker is in the operating position, lock devices L1, L2, L3 and L4 are provided. The lock devices cooperate with the interlocking bar 49 and a shutter 58 to secure the desired sequence of operation of the circuit breaker tripping mechanism, the disconnecting switches, the auxiliary breakers 43, which open the control power circuits, and the elevating mechanism for the circuit breaker unit.

The operating sequence is as follows: The trip button 52 is pushed inwardly to trip the circuit breaker mechanism and, as shown in Fig. 5, is locked in the tripped position by means of an arm 59 which is actuated by the lock L1 to engage a shoulder 61 on the trip rod 53. The key is then removed from the lock L1 and utilized to unlock L2.

When L2 is unlocked, a bolt 62 is moved from the path of a plate 63, which is attached to the operating lever 39 for the disconnecting switches. The disconnecting switches may then be opened by inserting a bar in the opening 41 of the lever 39 and actuating the lever to the open position, as shown in Fig. 3.

The disconnecting switches are then locked in the open position by the lock L3, which actuates a bolt 64 into an opening 65 provided in the plate 63. The key is then removed from the lock L3 and utilized to unlock L4. When L4 is unlocked, a bolt 66 is disengaged from the shutter 58.

The interlocking bar 49 is then actuated to its lowermost position, as shown in Fig. 3, thereby lowering the shutter 58 which is connected to the interlocking bar at 67. When the shutter 58 is lowered, a crank may be placed on the end of the operating shaft 25 through an opening 68 in the shutter 58. The shaft 25 may then be turned by the crank to lower the circuit breaker unit.

As previously explained, the operating handles 44 for the auxiliary breakers 43 are connected to the interlocking bar 49 by a rod 48. Therefore, when the outer end of the interlocking bar is pushed downwardly to lower the shutter 58, the auxiliary breakers are opened to disconnect the control power circuits.

As shown in Figs. 2, 3 and 4, a block 71 having a curved surface is connected to the shaft 13 by an arm 72, and is so disposed that the curved surface passes under a pin 73 carried by the inner end of the interlocking bar 49 as soon as the hand crank on the elevating mechanism is turned a small amount to lower the breaker unit 11 from the operating position. Therefore, the outer end of the interlocking bar 49 cannot be raised while the circuit breaker unit is being lowered from, or raised to, the operating position.

In this manner the mechanical tie between the shutter 58 and the elevating mechanism is such that the shutter cannot be raised, and the auxiliary breakers cannot be closed, except when the circuit breaker unit 11 is elevated to the operating position. Furthermore, the disconnecting switches cannot be closed since the key to the lock on the shutter cannot be removed and utilized to unlock the disconnecting switch mechanism to close the disconnecting switches unless the shutter is locked in its uppermost position where it covers the end of the operating shaft 25 for the elevating mechanism.

As soon as the breaker is raised to the operating position, the shutter can be raised by raising the outer end of the interlocking bar 49, and the shutter locked in the uppermost position. The key can then be removed from the lock on the shutter and utilized to unlock the disconnecting switch operating mechanism to permit closing of the disconnecting switches. The disconnecting switches may then be locked closed by the lock L2 and the key removed therefrom and utilized to unlock L1, thereby releasing the tripping mechanism for the circuit breaker 11.

In the modification of the invention shown in Figs. 6 to 12, inclusive, in which similar parts are designated by the same reference characters as in Figs. 1 to 5, an elevating mechanism which is suitable for raising and lowering relatively heavy circuit breaker units is provided. The elevating mechanism may be operated by rotating the shaft 25 in the same manner as hereinbefore described.

Likewise, the disconnecting switches may be operated by inserting a bar in the opening 41 in the lever 39, which is connected to the disconnecting switch operating mechanism by the rod 36. The auxiliary breakers 43 may be operated by the interlocking handle 49 which is connected to the handles of the auxiliary breakers by the rod 48.

Figure 10:
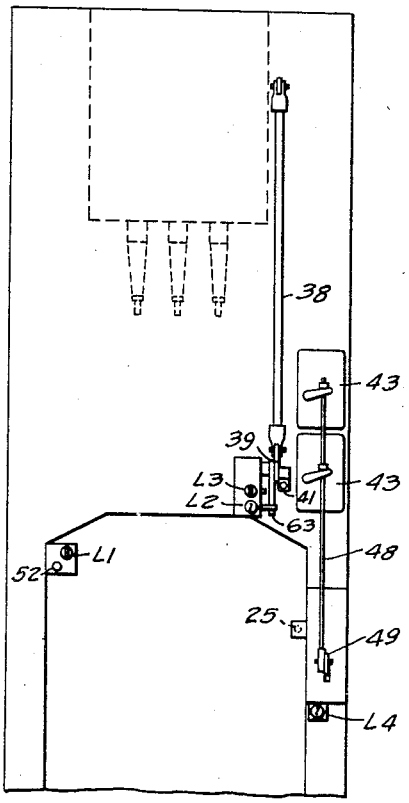
Fig. 10 is a reduced view, in front elevation, of the structure shown in Fig. 6.

As shown in Fig. 10, the lock devices L1, L2, L3 and L4 are located in slightly different positions, but they function in the same manner as hereinbefore described. As shown most clearly in Figs. 8 and 12, a pivotally mounted shutter 75 is provided in place of the sliding shutter 58, previously described. The shutter 75 is mounted on a pin 76 and is biased to the position in which it covers the end of the operating shaft 25 by a spring 77.

Figure 12:
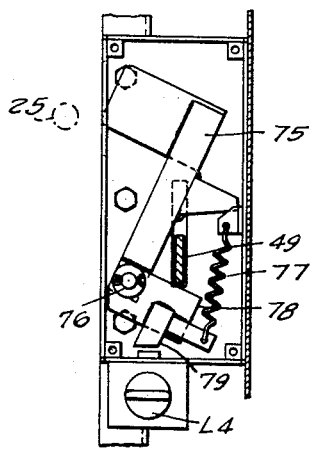
Fig. 12 is an enlarged detail view taken along the line XII—XII of Fig. 11.

As shown in Fig. 12, the shutter may be actuated to uncover the end of the shaft 25 by lowering the interlocking handle 49 which engages an arm 78 on the shutter 75. However, as shown in Fig. 8, the shutter cannot be actuated to uncover the end of the shaft 25 until after the lock L4 has been unlocked to remove the bolt 66 from the path of a blocking member 79, attached to the arm 78. As explained hereinbefore, the key which unlocks the lock L4 cannot be removed from the lock L3 until the disconnecting switches have been locked in the open position. Furthermore, the blocking member 79 prevents the removal of the key from the lock L4 while the end of the operating shaft 25 is uncovered by the shutter 75.

Figure 11:
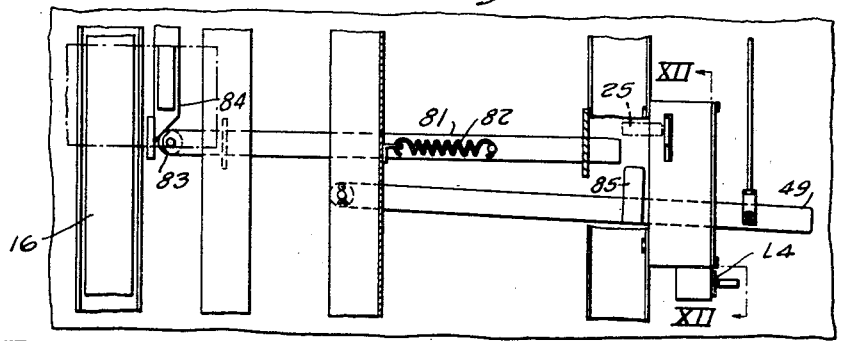
Fig. 11 is a view, similar to Fig. 6, showing the interlocking mechanism in the open position.

As shown in Figs. 6 and 11, the interlocking connection between the elevating mechanism for the circuit breaker unit and the interlocking handle 49 is provided by an interlocking bar 81, slidably mounted in the cell structure. The bar 81 is biased inwardly by a spring 82 and is actuated outwardly, when the breaker is lowered, by a roller 83, engaged by a cam plate 84, carried by the elevating member 16. As soon as the breaker unit moves downwardly the outer end of the interlocking bar 81 moves above a plate 85, secured to the interlocking handle 49. Therefore, the handle 49 cannot be raised while the breaker unit is being lowered from, or raised to, the operating position. The sequence of operation of the locking devices and the interlocking mechanism is the same as that hereinbefore described.

From the foregoing description it is apparent that I have provided a scheme for interlocking the elevating mechanism of a circuit breaker unit with the operating mechanism for disconnecting switches and auxiliary breakers which positively insures that the disconnecting switches and the auxiliary breakers are open and held in the open position at all times except when the main breaker unit is in the operating position since the position of the main breaker is definitely and at all times tied in with any movement whatsoever of the elevating mechanism. Furthermore, this scheme insures that the disconnecting switches are locked in the open position and the auxiliary breakers are tripped before any attempt can be made to lower the main breaker unit.

Since numerous changes may be made in the above-described construction, and different embodiments of the invention may be made without departing from the spirit and scope thereof, it is intended that all matter contained in the foregoing description or shown in the accompanying drawing shall be interpreted as illustrative and not in a limiting sense.

I claim as my invention:

1. In switchgear apparatus, the combination with a cell structure having a circuit breaker unit and disconnecting switches disposed therein, of an elevating mechanism for raising and lowering the breaker unit to and from the operating position in the cell, means for opening and closing the disconnecting switches, mechanical interlocking means for preventing operation of said mechanism while the disconnecting switches are closed, and additional mechanical interlocking means controlled by said mechanism for preventing closing of the disconnecting switches except when the breaker unit is elevated to the operating position.

2. In switchgear apparatus, the combination with a cell structure having a circuit breaker unit and disconnecting switches disposed therein, of an elevating mechanism for raising and lowering the breaker unit to and from the operating position in the cell, means for opening and closing the disconnecting switches, mechanical interlocking means for preventing operation of said mechanism while the disconnecting switches are closed, and mechanical means engaged by said mechanism to prevent closing of the disconnecting switches while the breaker unit is being raised to and lowered from the operating position.

3. In switchgear apparatus, the combination with a cell structure having a circuit breaker unit and disconnecting switches disposed therein, of a mechanism for actuating the breaker unit to and from the operating position in the cell, a lock device for said mechanism, means for opening and closing the disconnecting switches, a lock device for said means, and interlocking means cooperating with said lock devices to prevent operation of said mechanism while the disconnecting switches are closed and to prevent closing of the disconnecting switches except when the breaker unit is in the operating position.

4. In switchgear apparatus, the combination with a cell structure having a circuit breaker unit and disconnecting switches disposed therein, of a mechanism for actuating the breaker unit to and from the operating position in the cell, a lock device for said mechanism, means for opening and closing the disconnecting switches, a lock device for said means, and mechanical interlocking means engaged by said mechanism and cooperating with said lock devices to prevent operation of said mechanism while the disconnecting switches are closed and to prevent closing of the disconnecting switches while the breaker unit is being actuated to and from the operating position.

5. In switchgear apparatus, the combination with a cell structure having a circuit breaker unit and disconnecting switches disposed therein, of a mechanism for actuating the breaker unit to and from the operating position in the cell, a lock device for said mechanism, means for opening and closing the disconnecting switches, a lock device for said means, means for tripping the circuit breaker, and a lock device for said tripping means, said lock devices cooperating to prevent opening the disconnecting switches while the circuit breaker is closed and to prevent operation of said mechanism while the disconnecting switches are closed.

6. In switchgear apparatus, the combination with a cell structure having a circuit breaker unit and disconnecting switches disposed therein, of a mechanism for actuating the breaker unit to and from the operating position in the cell, a lock device for said mechanism, means for opening and closing the disconnecting switches, a lock device for said means, means for tripping the circuit breaker, a lock device for said tripping means, said lock devices cooperating to prevent opening the disconnecting switches while the circuit breaker is closed and to prevent operation of said mechanism while the disconnecting switches are closed, and interlocking means cooperating with said lock devices to prevent closing of the disconnecting switches except when the breaker unit is in the operating position.

7. In switchgear apparatus, the combination with a cell structure having a main circuit breaker unit and disconnecting switches disposed therein, of an auxiliary circuit breaker, a mechanism for actuating the breaker unit to and from the operating position in the cell, means for opening and closing the disconnecting switches, means for opening and closing the auxiliary circuit breaker, and interlocking means for preventing operation of said mechanism while the disconnecting switches and the auxiliary circuit breaker are closed.

8. In switchgear apparatus, the combination with a cell structure having a main circuit breaker unit and disconnecting switches disposed therein, of an auxiliary circuit breaker, a mechanism for actuating the breaker unit to and from the operating position in the cell, means for opening and closing the disconnecting switches, means for opening and closing the auxiliary circuit breaker, interlocking means for preventing operation of said mechanism while the disconnecting switches and the auxiliary circuit breaker are closed, and additional interlocking means for preventing closing of the disconnecting switches and the auxiliary circuit breaker except when the breaker unit is in the operating position.

ELMER A. ROTHFUS.

REFERENCES CITED

The following references are of record in the file of this patent:

UNITED STATES PATENTS

| Number | Name | Date |
|---|---|---|
| 1,709,281 | Palin | Apr. 6, 1929 |
| 1,929,983 | MacNeil | Oct. 10, 1933 |